Figure 1:
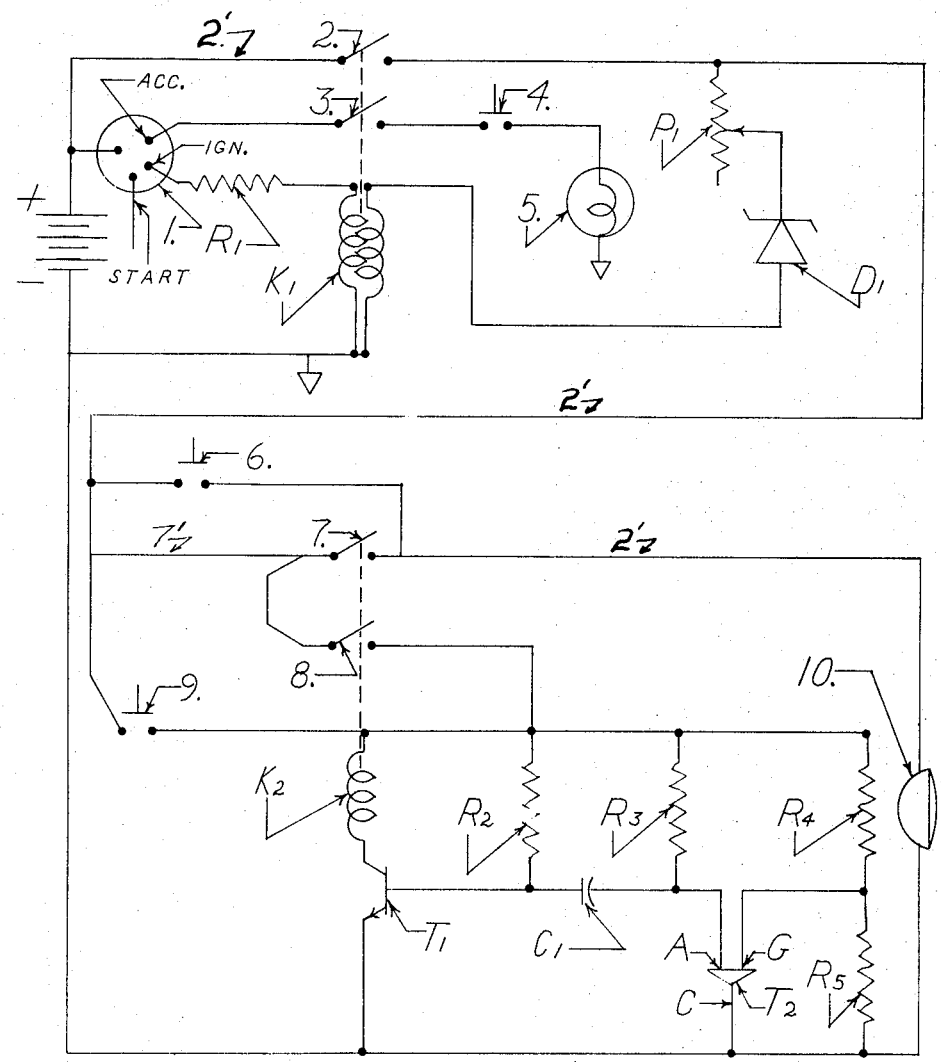

United States Patent [19]
Russell

[11] 3,723,752
[45] Mar. 27, 1973

[54] COMBINATION TIME DELAY AND SELF-ACTUATING VOLTAGE LEVEL PROTECTIVE CIRCUIT FOR VEHICULAR ELECTRICAL SYSTEMS

[75] Inventor: Carl D. Russell, Tulsa, Okla.

[73] Assignees: Harvey C. Overholt; Anna E. Overholt, Stillwater; W. L. Kygar; R. A. Parker; Evelyn B. Parker, Ponca City, all of Okla.; part interest to each

[22] Filed: Nov. 5, 1971

[21] Appl. No.: 196,027

[52] U.S. Cl. ............... 307/10 BP, 315/77, 315/83
[51] Int. Cl. ............................................. H02g 3/00
[58] Field of Search ....... 307/10 R, 10 BP; 315/77 X, 315/82, 83 X, 81, 84; 320/40

[56] References Cited

UNITED STATES PATENTS 3,588,591  6/1971  Harris ........................... 307/10 BP
3,433,969  3/1969  Krenke ........................... 307/10 BP Primary Examiner—Herman J. Hohauser
Attorney—Wilfred G. Caldwell

[57] ABSTRACT

The invention resides in a modification of the vehicular electrical system to include a protected time delay circuit for maintaining the lights or the like ON for a predetermined period after initiation, and a voltage sampling interrupter for interrupting the electrical system when the battery voltage decays to a predetermined level if the lights or other load have been inadvertently left ON or short circuited, including the time delay circuit. One embodiment interrupts the power lead and accessory lead to protect the battery, whereas the other embodiment provides a direct load path via the accessory contact of the ignition switch and an interruptible power bypass for a portion of the load path useful when the ignition is OFF. The circuit interrupts the power bypass lead to protect the battery.

10 Claims, 2 Drawing Figures

COMBINATION TIME DELAY AND SELF-ACTUATING VOLTAGE LEVEL PROTECTIVE CIRCUIT FOR VEHICULAR ELECTRICAL SYSTEMS

The most pertinent prior art, upon which the present invention improves, is U. S. Pat. No. 3,462,647, issued Aug. 19, 1969, and U.S. Ser. No. 38,693, now U.S. Pat. No. 3,623,131, filed May 19, 1970, both invented by the present applicant.

The present invention comprises an inexpensive apparatus for achieving the functions of protection of a vehicular battery at a predetermined minimum voltage level and the maintaining of a load active, such as the vehicular lights, for a predetermined time after initiation, for example to allow the person safely to exit from the vehicle and enter his house or other building.

Both functions are achieved through a unique power lead and sensing circuit for one or more of the accessory loads, which circuit, in one embodiment, includes a switch in the power lead operable by a double wound coil with one winding extending by way of a safety connection to the ON position of the ignition switch, thereby insuring that during operation of the vehicle there is always at least one winding maintaining the power connection to the loads. But, once the ignition is OFF there is maintained a voltage sensing series circuit from the power lead to the other winding for interrupting the voltage supply at a fixed level in the event of a short circuit or other battery drain, and these circuits are isolated from each other.

The power switch is opened to achieve disconnect when the vehicle battery decays to, for example 12.8 volts on certain makes of vehicles or to voltage levels as high as 14 to 15 volts on other makes of vehicles, but in any event to a level which is still sufficient to start the car. (Actually fully charged socalled 12 volt vehicle batteries range from approximately 14 to 18 volts and their levels must be maintained above their rating for effective operation.) This switch also serves as holding contacts for the voltage sensing circuit and when the voltage decays to a point where a zener diode in the series circuit drops out, these holding contacts open the sensing and power circuit to preserve the battery energy.

The timing circuit is effective above the predetermined voltage and may be initiated by the vehicle operator, as desired. It comprises a capacitor chargable to a predetermined voltage after a push button is depressed because a holding circuit is actuated to establish a bypass around the light switch from the power lead, thereby, lighting the vehicle lights and to maintain capacitor charging current; however when it reaches a predetermined charge level, it opens a PUT circuit and discharges therethrough, releasing the holding circuit after a predetermined time.

The battery voltage applied to the circuit is derived via the switch of the power lead for two reasons. The first is so the timing circuit will not be operated if the voltage is at or below the protected level to cause further drain, and the second is to enable the protective circuit to protect against any possible malfunctions in the timing circuit.

While the solid state timing circuit herein disclosed is much more reliable than the thermal or bimetalic strip type timing circuits in current use on vehicles, nevertheless the protection is desirable in order that the entire vehicle electrical system is safe-guarded.

It may now be appreciated that either function can be achieved independently if supervision of the timing circuit is not desired.

The present invention improves over the known prior art because of its unique timer bypass of the load switch only, the isolation of the ignition circuit, and its operation of a switch in a battery power lead, as well as, the provision of a holding circuit in the timer circuitry.

In the preferred embodiment of the invention, isolation is achieved through a suitable ignition switch of the well known type wherein a "hot" lead is extended from the battery to the ignition switch contact normally labelled "accessory," as well as to the ignition ON contact simultaneously, but preferablly over independent connections. Thus, the accessory circuit extends to the load, i.e. headlamps, but only when the key is effective in the ignition switch.

Once the ignition key has been turned, the energization lead is completed, and a relay coil closes a switch in a power lead bypass of the ignition accessory contacts, thereby insuring operation of the circuitry without requiring the vehicle key, so long as the battery voltage is above the predetermined level.

Figure 2:
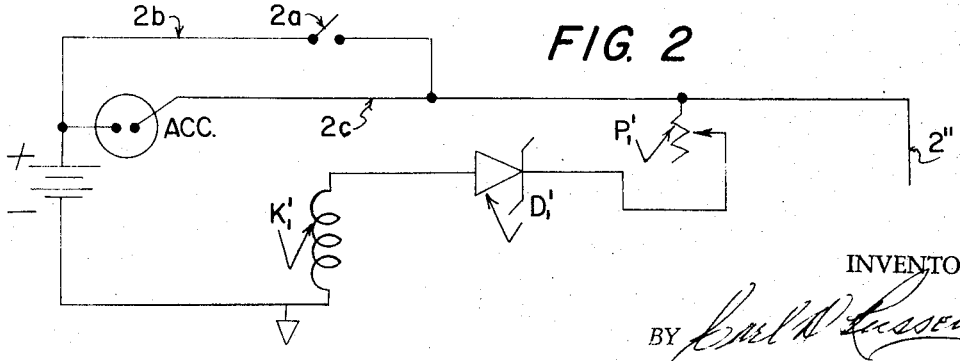

The invention will be further described in connection with the embodiments thereof shown in the attached drawings wherein:

FIG. 1 is an electrical circuit type illustration showing one embodiment of the present invention susceptible to general application; and FIG. 2 is a partial electrical schematic to show a modification of the embodiment of FIG. 1 in a preferred form for application to vehicles having suitable ignition switches.

In FIG. 1, the upper portion including the ignition switch 1 and the battery is the voltage level protection circuit, whereas, the lower portion of the circuitry, below the headlamp switch 6 is the timer circuitry for controlling the settable lighting period of headlamp 10. The ignition switch 1 includes the usual ignition or ON contact, shown at IGN., and the start contact indicated at START. In addition it includes an accessary contact, indicated by ACC.

Power lead 2' extends from the battery positive side, through the power lead switch 2, and thence via headlamp switch 6, directly to headlamp 10, the lower portion being grounded, as shown by the grounding arrow beneath the double wound relay coil $K_1$. Either coil of the common core of $K_1$ is provided to open and close power lead switch 2, and accessory lead switch 3. The left hand winding of relay $K_1$ is connected over resistor $R_1$ of e.g. 25 ohms to the ignition or ON contact of ignition switch 1. Hence, whenever, the ignition is on, the drive can be assured that at least the left hand coil of $K_1$ is maintaining power lead switch 2 and accessory lead switch 3 closed. The vehicle accessory switch 4 i.e. for heater, radio or the like, need merely be turned on to energize the associated accessory load 5. Of course, a great many of these circuits are connected in parallel (each with its own vehicle switch) for the various accessory loads of the modern day vehicle, and only one circuit is shown for simplicity. Accessory lead switch is preferably common to all accessory loads.

However, it will be noted that the voltage level protection circuit will cause both switches 2 and 3 to open, whenever the battery voltage falls below the predetermined level (when the ignition is not on) thereby completely disconnecting all accessories from the battery to preserve its energy. This is achieved over the voltage sensing circuit, which includes potentiometer $P_1$ of, for example 0 to 500 ohms, connected by way of zener diode $D_1$, and thence to the right hand coil of double wound relay $K_1$. So long as a small current flows through this voltage sensing circuit, it will maintain switches 3 and 3 closed, in readiness for operation of the headlamps or any accessories. It should be noted that no special ignition contacts or switches are required to achieve this supervisory action.

While the zener diode $D_1$ operates in its usual fashion, requiring a predetermined voltage drop for sustaining conduction, the operation of the entire voltage sensing circuit may perhaps best be explained by using a typical example. Since $K_1$ is a 6 volt D.C. relay, it will remain energized as long as its share of the voltage remains above its dropout level. For example, assume that the battery voltage is 13 volts and that $D_1$ is a fixed 6.8 volt zener. This means that $D_1$ will maintain 6.8 volts across it and current will be conducted through it as long as this 6.8 volts is present. However, as soon as the voltage across $D_1$ drops below 6.8 volts, the zener diode will cease conducting, and no current will flow through it to maintain $K_1$ energized. Thus, in the example, if the battery voltage goes below 13 volts, then the voltage across potentiometer $P_1$ is less than 0.2 volt, the voltage across $D_1$ therefor becomes less than 6.8 volts and the zener shuts current flow off from the $K_1$ coil. The $K_1$ coil then opens switches 2 and 3 to protect the remaining energy in the battery. Potentiometer $P_1$ is provided to permit adjusting of the voltage drop across zener diode $D_1$, particularly for replacement purposes since the replacement diode characteristics are not always identical.

Turning now to the timer section of the circuitry, it will be noted that the headlamp switch 6 is in the main power lead 2' leading to headlamp 10. In parallel, or serving as a bypass, with headlamp switch 6 is the connection 7' including switch 7 adapted to be opened and closed by relay coil $K_2$ acting as a double pole single throw switch because it also manipulates holding circuit switch 8. The purpose of the timing circuitry is to bypass headlamp switch 6 in alotting a predetermined amount of time for maintaining the headlights in a lighted condition to enable the vehicle occupant to enter his home or other building while the lights remain on, with assurance that they will automatically be turned off. When the operator pushes push button 9, it initiates the timing operation because immediately current flows through relay coil $K_2$ by virtue of the PNP transistor $T_1$ (path to ground) which has been in an off condition and, energization of $K_2$ closes both switches 7 and 8. Current also flows through the 1.8 meg-ohm resistor $R_3$ to charge the 10 micro-farad capacitor $C_1$ positive on the right and negative on the left, because this charging current passes through transistor $T_1$ to ground. $R_3$ enables potential build-up to the firing point for PUT shown at $T_2$. The charging rate is controlled by resistor $R_2$ of 2.2 K-ohm by current also flowing through transistor $T_1$.

When capacitor $C_1$ is charged to a predetermined level, it elevates the potential of anode A of the PUT, sufficiently relative to its gate G, which is at a potential of approximately 8 volts due to the voltage divider, including resistors $R_4$ and $R_5$ of 1.5K and 2.7K-ohms respectively, so as to cause conduction and open the path through PUT cathode C to ground. The capacitor $C_1$ discharges rapidly through $T_2$ to cause current to cease flowing through relay coil $K_2$. A holding circuit was established over switch 8 for $K_2$ which permitted push button 9 to return instantly.

Turning now to the circuit of FIG. 2, it will be appreciated that the power lead 2'' corresponds to the power lead 2' of FIG. 1 in respect to the timing circuitry, and that FIG. 2 will normally include the same circuitry for the headlamp switch 6 and the timing components as previously described in connection with FIG. 1. However, isolation is achieved in a different manner in the circuitry of FIG. 2 because the accessory contact (ACC.) is utilized out of the ignition switch rather than the ignition contact.

Almost all of the ignition switches in existence have a "hot" lead extended to both the accessory contact and the ignition contact when the key is ON, and these two circuits are isolated from each other in the ignition switch. The circuitry of FIG. 2 is applicable to such a vehicle including this type ignition circuit because the power lead 2c extends from the accessory contact to the power lead 2'', such that, whenever the ignition is ON, the battery is connected directly to the headlamp circuit (also the timing circuit) by way of head light switch 6 (or timer switch 9).

Once the ignition is turned ON, relay coil $K_1'$ is energized over the voltage sensing path including potentiometer $P_1'$, zener diode $D_1'$ in the manner heretofore explained in connection with the double wound coil $K_1$. Energization of relay coil $K_1'$ closes switch 2a in power bypass lead 2b to insure that the circuitry will remain in the voltage sensing condition so long as the battery is above the predetermined level, regardless of the vehicle ignition condition or key. Thus, the voltage sensing function is maintained and, also the timing function in the manner, heretofore explained.

What is claimed is:

1. Apparatus for use in connection with a vehicular electrical system having a source of voltage and one or more switch energized loads and including a battery connected ignition switch comprising in combination, a power lead extending the connection from the source for making source voltage available to at least one of said loads via said ignition switch; and at least one load switch voltage sampling means for interrupting the power lead when the voltage falls to a predetermined voltage level; and timing means supplying voltage to the one load from the power lead and for interrupting the supplying voltage after a predetermined time.

2. The apparatus of claim 1 wherein the timing means comprise a bypass circuit around only said load switch.

3. The apparatus of claim 1, wherein the ignition switch includes an accessory contact and one or more accessory loads each having an accessory load switch in series therewith are included in said vehicle, further comprising at least one circuit from the ignition accessory contact to an accessory load switch; and a switch under control of said voltage sampling means to interrupt current flow in said one circuit whenever the voltage falls to said predetermined level.

4. The apparatus of claim 1 wherein said voltage sampling means comprises a switch in the power lead between the ignition and said load switch for interrupting the power lead, a safety connection from the ignition switch to insure energization of the voltage sampling means when the ignition is ON, and a voltage sensing connection from the power lead to the voltage sampling means for insuring energization of the voltage sampling means when the ignition is OFF and the voltage is above said predetermined level.

5. The apparatus of claim 4 wherein said voltage sampling means comprises a double wound coil with one winding thereof connected for energization via the safety connection and the other winding thereof connected for energization over the voltage sensing connection.

6. The apparatus of claim 1 wherein the voltage sampling means comprises a coil having two windings on a common core; a safety connection from the ignition switch to one of said windings; and a voltage sensing connection from the power lead to the other of said windings.

7. The apparatus of claim 6 wherein the voltage sensing connection comprises a zener diode and adjustable resistance.

8. The apparatus of claim 1 wherein the timing means comprises a bypass connection around said load switch and a switch in said bypass connection; means for operating the bypass switch; means for energizing the operative means to initiate the timing operation by actuating the bypass switch to energize said one load; capacitor charging means initiated by said means for energizing to charge the capacitor; and capacitor discharging means operable at a predetermined level of capacitor charge to discharge the capacitor and de-energize said operating means to terminate the timing operation.

9. Apparatus for use in connection with a vehicular electrical system having a source of voltage and one or more switch energized loads and including a battery connected ignition-accessory switch comprising in combination, a power lead extending the connection from the source for making source voltage available to at least one of said loads via said ignition-accessory switch; a by-pass power lead extending from the battery to said power lead; at least one load switch voltage sampling means for interrupting the bypass power lead when the voltage falls to a predetermined voltage level; and timing means supplying voltage to the one load from the power lead and for interrupting the supplying voltage after a predetermined time.

10. The apparatus of claim 9 wherein the timing means comprise a bypass circuit around only said load switch.

* * * * *